United States Patent
Zhang et al.

(10) Patent No.: US 6,694,603 B1
(45) Date of Patent: Feb. 24, 2004

(54) PROCESS OF FORMING A MAGNETIC MICROACTUATOR

(75) Inventors: Lei Zhang, San Jose, CA (US); Patrick J. Ryan, St. Paul, MN (US); Peter Crane, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 301 days.

(21) Appl. No.: 09/613,376

(22) Filed: Jul. 11, 2000

Related U.S. Application Data

(62) Division of application No. 09/010,100, filed on Jan. 21, 1998, now Pat. No. 6,122,149.
(60) Provisional application No. 60/050,669, filed on Jun. 24, 1997.

(51) Int. Cl.[7] ............................ G11B 5/127; H04R 31/00
(52) U.S. Cl. .................. 29/603.03; 29/598; 29/603.14; 29/603.15; 29/603.16; 216/39; 216/41; 216/48; 360/120; 360/121; 360/122; 360/126
(58) Field of Search .............................. 29/598, 603.01, 29/603.03, 603.04, 603.14, 603.15, 603.16; 360/260, 265, 119, 120, 121, 122, 123, 125, 126; 216/39, 41, 48

(56) References Cited

U.S. PATENT DOCUMENTS

| | | | | |
|---|---|---|---|---|
| 3,662,119 A | * | 5/1972 | Romankiw et al. | 179/100.2 |
| 4,044,394 A | * | 8/1977 | Hanazono et al. | 360/123 |
| 4,622,574 A | * | 11/1986 | Garcia | 357/55 |
| 4,698,711 A | * | 10/1987 | Vinal | 360/113 |
| 4,743,988 A | * | 5/1988 | Sato et al. | 360/126 |
| 4,825,318 A | * | 4/1989 | Hoo et al. | 360/113 |
| 4,997,521 A | | 3/1991 | Howe et al. | 156/651 |
| 5,105,408 A | | 4/1992 | Lee et al. | 369/44.15 |
| 5,164,869 A | * | 11/1992 | Fontana et al. | 360/113 |
| 5,173,826 A | * | 12/1992 | Bischoff | 360/126 |
| 5,189,578 A | | 2/1993 | Mori et al. | 360/106 |
| 5,276,573 A | | 1/1994 | Harada et al. | 360/103 |
| 5,560,097 A | * | 10/1996 | Bajhorek et al. | 29/603.12 |
| 5,657,188 A | | 8/1997 | Jurgenson et al. | 360/106 |
| 5,703,740 A | * | 12/1997 | Cohen et al. | 360/126 |
| 5,724,015 A | | 3/1998 | Tai et al. | 335/78 |
| 5,761,790 A | * | 6/1998 | Carr et al. | 29/603.15 |
| 5,779,643 A | * | 7/1998 | Lum et al. | 600/462 |
| 5,808,384 A | | 9/1998 | Tabat et al. | 310/40 |
| 5,877,920 A | * | 3/1999 | Resh | 360/245.7 |
| 5,883,760 A | * | 3/1999 | Yamada et al. | 360/291 |
| 5,898,541 A | * | 4/1999 | Boutaghou et al. | 29/603.01 |
| 5,943,189 A | | 8/1999 | Boutaghou et al. | 360/103 |
| 5,998,859 A | * | 12/1999 | Griswold et al. | 257/679 |
| 6,081,402 A | * | 6/2000 | Cho | 360/77.04 |
| 6,195,232 B1 | * | 2/2001 | Cohen | 360/126 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

*Primary Examiner*—Peter Vo
*Assistant Examiner*—Paul Kim
(74) *Attorney, Agent, or Firm*—Kinney & Lange, P.A.

(57) ABSTRACT

A process of forming a microactuator for positioning a transducing head over a selected radial track of a rotatable disc in a disc drive system is disclosed. A tub is etched in a substrate, and a bottom coil layer is plated at least partially in the tub. A first insulating layer is deposited on the bottom coil layer. A ferromagnetic core layer is formed on the first insulating layer. A second insulating layer is deposited on and around the ferromagnetic core layer. A top coil layer is plated on the second insulating layer, and contacts the bottom coil layer at a point spaced from the ferromagnetic core. A rotor is formed on a rotor substrate to confront the ferromagnetic core, is operatively attached to the slider and is movable with respect to the ferromagnetic core.

7 Claims, 15 Drawing Sheets

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani eta l., *IEEE Transactions on Magnetics*, vol. 27, No. 6, Nov. 1991.

"Silicon Microstructures and Microactuators for Compact Computer Disk Drives" by Miu et al., *IEEE Control Systems*, 1994.

"Silicon Microactuators for Rigid Disk Drives" by Miu, *Data Storage*, Jul./Aug. 1995.

* cited by examiner

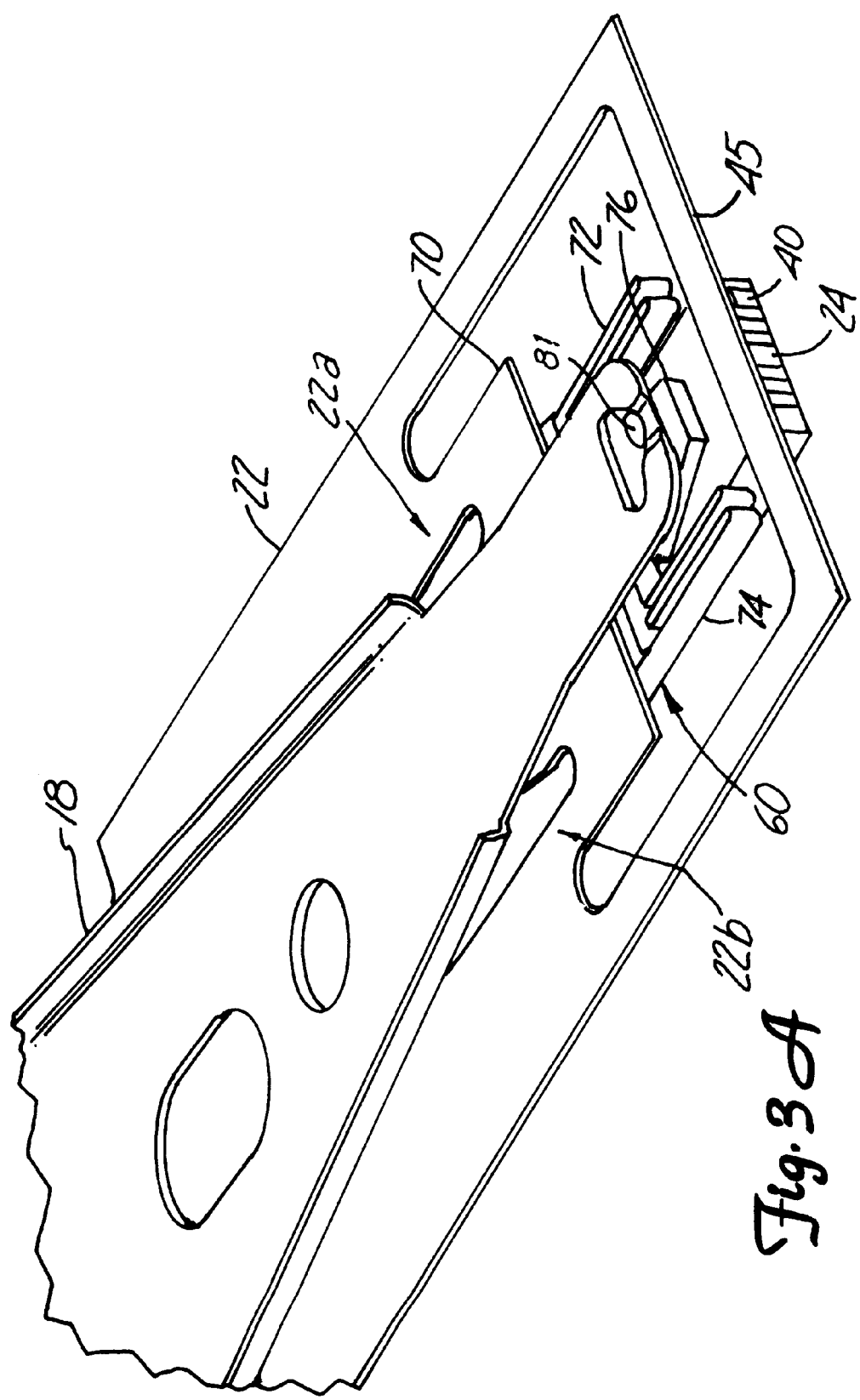

PROCESS OF FORMING A MAGNETIC MICROACTUATOR

CROSS-REFERENCE TO RELATED APPLICATION

This application is a division of U.S. application Ser. No. 09/010,100 entitled "Magnetic Microactuator and Inductive Sensor Having Shaped Pole Configuration" filed Jan. 21, 1998 by L. Zhang, P. Ryan and P. Crane now U.S. Pat. No. 6,122,149, which in turn claims priority from Provisional Application No. 60/050,669 entitled "Shaped-Pole Configuration For Magnetic Micro Actuator and Inductive Sensor" filed Jun. 24, 1997 by L. Zhang, P. Ryan and P. Crane.

BACKGROUND OF THE INVENTION

The present invention relates to a disc drive slider microactuator and sensor, and more particularly to a silicon-based thin film electromagnetic transducer providing improved actuation force and sensor sensitivity in a disc drive system.

The density of concentric data tracks on magnetic discs continues to increase (that is, the radial distance between data tracks is decreasing), requiring greater precision of head positioning. Conventionally, head positioning is accomplished by operating an actuator arm with a large-scale actuator motor, such as a voice coil motor, to position a head on a gimbal at the end of the actuator arm. The large-scale motor lacks sufficient resolution to effectively accommodate high track-density discs. Thus, a high resolution head positioning mechanism, or microactuator, is necessary to accommodate the more densely spaced tracks.

Various microactuator locations and designs have been considered to achieve high resolution head positioning. One promising design involves inserting a silicon-based thin film structure between the suspension and the slider in a disc drive assembly. The microactuator includes, for example, an electromagnetic transducer having magnetic core materials forming a stator and a rotor, with conductive coils wrapped around the stator core in a solenoid-type or planar-type configuration. One of the major technical challenges in implementing such a microactuator is to provide sufficiently large actuation force to overcome friction forces and spring bias forces to drive the head at a speed high enough to accommodate the required bandwidth. Such a design must be realized in a relatively small wafer area, to keep costs reasonable and to allow easy integration into the disc drive design. It would also be useful for the microactuator to include a position sensor to discern the relative position of the movable portion of the microactuator.

Therefore, there is a need in the art for a microactuator design providing large actuation force with reasonable power consumption and within a reasonable wafer area to microposition a transducing head at a speed that accommodates the high bandwidth required by high performance disc drives, and further for a microactuator design that includes the capability to sense the position of the movable portion of the microactuator.

BRIEF SUMMARY OF THE INVENTION

The present invention is a microactuator for positioning a transducing head over a selected track of a rotatable disc in a disc drive system having a flexure to support a slider carrying the transducing head. The microactuator includes a stator operatively attached to the flexure. The stator includes a first pole piece having first and second ends, and a second pole piece substantially parallel to and spaced from the first pole piece, also having first and second ends. A via magnetically connects the first pole piece and the second pole piece. The first and second pole pieces are shaped so that a first gap between the first end of the first pole piece and the first end of the second pole piece is smaller than a second gap between the second end of the first pole piece and the second end of the second pole piece. A plurality of coils are wrapped around the stator. The microactuator further includes a rotor confronting the second end of the first pole piece and the second end of the second pole piece, the rotor being operatively attached to the slider. The rotor is movable with respect to the stator in response to an electrical current applied through the coils, and movement of the rotor alters a radial position of the transducing head with respect to the flexure.

A further aspect of the invention is a dual port device for positioning and sensing the position of a transducing head with respect to a selected track of a rotatable disc in a disc drive system having a flexure to support a slider carrying the transducing head. First and second ports of the dual port device each include a stator operatively attached to the flexure. The stator includes first and second pole pieces substantially parallel to and spaced from each other and each having first and second ends. A via connects the first and second pole pieces. The first and second pole pieces are shaped so that a first gap between the first end of the first pole piece and the first end of the second pole piece is smaller than a second gap between the second end of the first pole piece and the second end of the second pole piece. A plurality of coils are wrapped around the stator. A rotor confronts the second end of the first pole piece and the second end of the second pole piece, and is operatively attached to the slider. The first port is a microactuator wherein the rotor is movable with respect to the stator in response to a current applied through the coils. Movement of the rotor alters a radial position of the transducing head with respect to the flexure. The second port is an inductive position sensor wherein movement of the rotor is related to an inductance of the sensor.

Another aspect of the present invention is a process of forming a microactuator for positioning a transducing head over a selected radial track of a rotatable disc in a disc drive system having a flexure to support a slider carrying the transducing head. A tub is etched in a substrate. A first insulating layer is deposited on the substrate. A bottom coil layer is plated on the first insulating layer at least partially in the tub. A second insulating layer is deposited on the bottom coil layer. A ferromagnetic core layer is formed on the second insulating layer. A third insulating layer is deposited on and around the ferromagnetic core layer. A top coil layer is plated on the third insulating layer to contact the bottom coil layer at a point spaced from the ferromagnetic core. A rotor is formed to confront the ferromagnetic core, the rotor being movable with respect to the ferromagnetic core.

A further aspect of the present invention is a process of forming a microactuator for positioning a transducing head over a selected radial track of a rotatable disc in a disc drive system having a flexure to support the slider carrying the transducing head. A bottom coil layer is plated on a first insulating layer, and a second insulating layer is deposited on the bottom coil layer. A yoke is formed on the first insulating layer. A ferromagnetic core layer is formed over the yoke. A third insulating layer is deposited on and around the ferromagnetic core layer. A top coil layer is plated on the third insulating layer to contact the bottom coil layer at a point spaced from the ferromagnetic core. A rotor is formed confronting the ferromagnetic core, the rotor being movable with respect to the ferromagnetic core. The rotor may also be formed over a yoke.

Another aspect of the present invention is a microactuator for positioning a transducing head over a selected track of a rotatable disc in a disc drive system having a flexure to support a slider carrying the transducing head. The microactuator includes a stator, a rotor and an air gap separating the stator from the rotor. The stator includes a bottom pole piece, a non-magnetic spacer on the bottom pole piece and a top pole piece vertically spaced from the bottom pole piece. The top pole piece includes a via portion connecting the top and bottom pole pieces. A plurality of coils are wound around the stator. The rotor includes a bottom pole piece, a non-magnetic spacer on the bottom pole piece and a top pole piece vertically spaced from the bottom pole piece. The top pole piece includes a via portion connecting the top and bottom pole pieces. The air gap separates the stator from the rotor such that the bottom pole piece of the rotor confronts the bottom pole piece of the stator, the non-magnetic spacer of the rotor confronts the non-magnetic spacer of the stator, and the top pole piece of the rotor confronts the top pole piece of the stator across the air gap.

BRIEF DESCRIPTION OF THE DRAWINGS

FIG. 3A is a top perspective view of a disc drive microactuation system for positioning a slider over tracks of a disc according to the present invention.

DETAILED DESCRIPTION OF THE PREFERRED EMBODIMENTS

Figure 1:
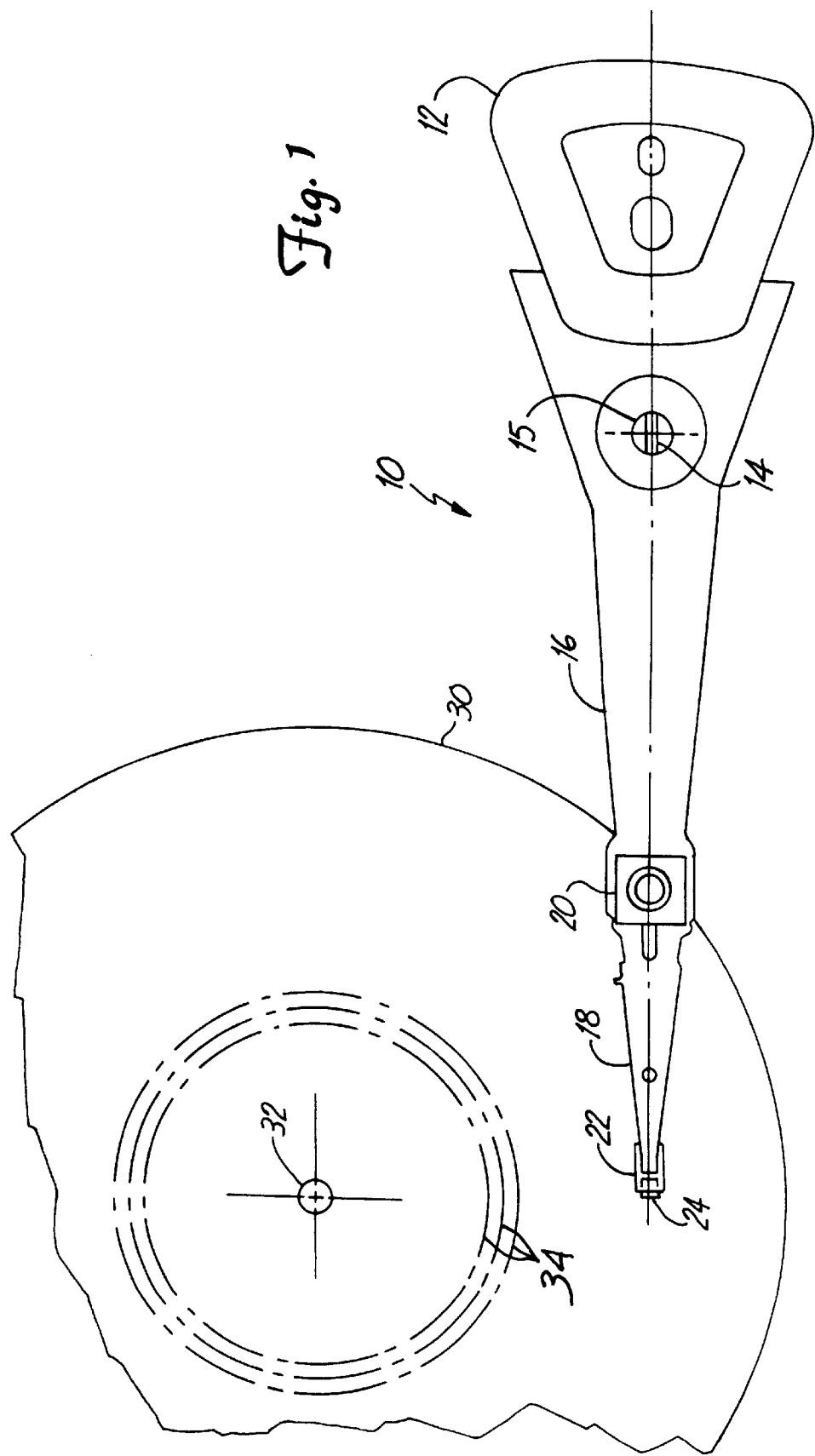
FIG. 1 is a plan view of a disc drive actuation system for positioning a slider over tracks of a disc.

FIG. 1 is a plan view of a disc drive actuation system 10 for positioning slider 24 over a track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on concentric tracks of disc 30. Disc 30 rotates around axis 32, so that windage is encountered by slider 24 to keep it aloft a small distance above the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 precisely over a selected track 34 of disc 30. Therefore, a higher resolution actuation device is necessary.

Figure 2:
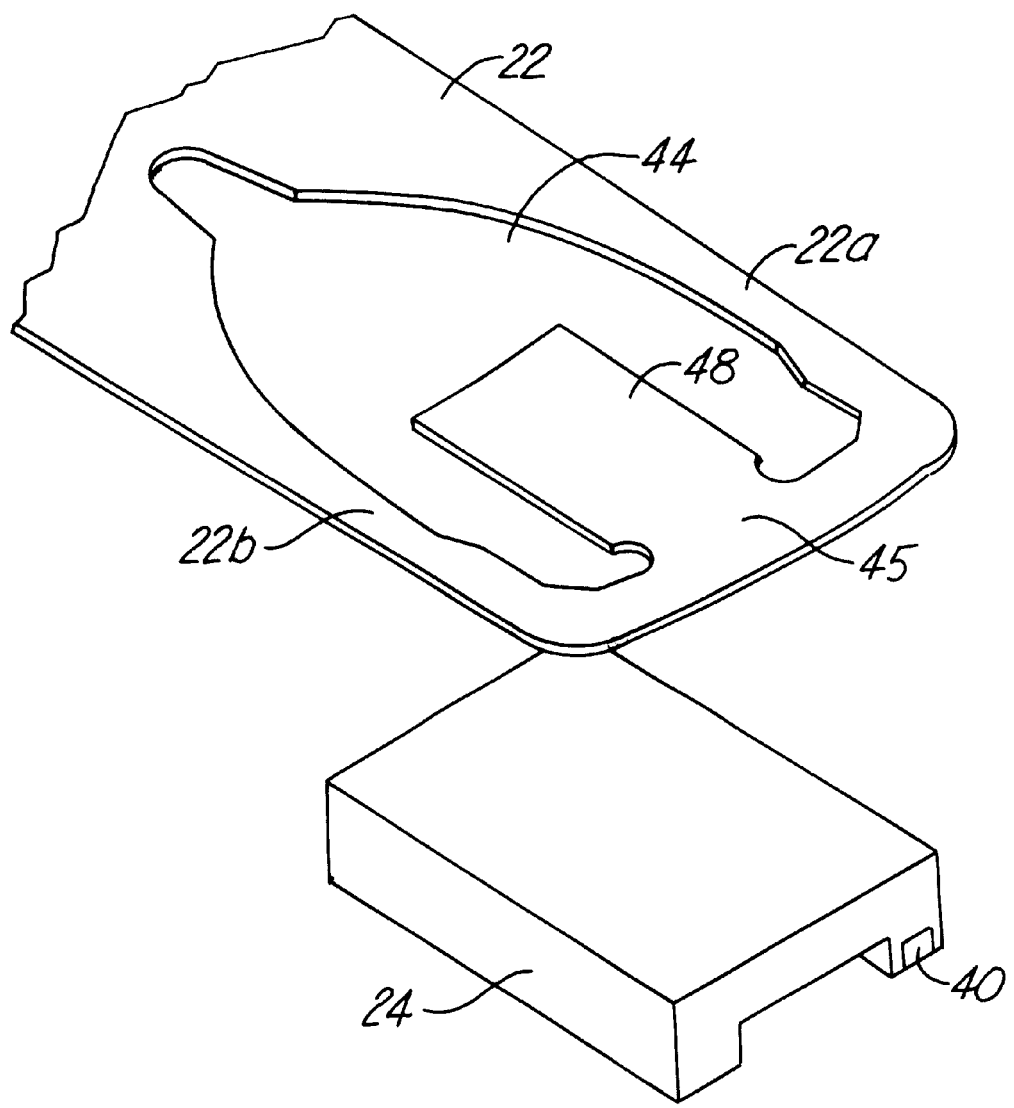
FIG. 2 is an exploded perspective view of a portion of the disc drive actuation system shown in FIG. 1, illustrating the relationship between the flexure and the slider in more detail.

FIG. 2 is an exploded perspective view of a portion of the disc drive system shown in FIG. 1, showing flexure 22 and slider 24 in more detail. Flexure 22 is mounted to the underside of a distal end of head suspension 18 (FIG. 1). Flexure 22 includes arms 22a and 22b forming aperture 44 therebetween to provide resilience and gimbaling spring to flexure 22. The distal end of arms 22a and 22b are connected via cross beam 45. Central tongue spring 48 extends from cross beam 45 into aperture 44 in a plane generally parallel to a plane defined by flexure arms 22a and 22b. The top surface of slider 24 is attached, such as by adhesive, to tongue spring 48.

Figure 3B:
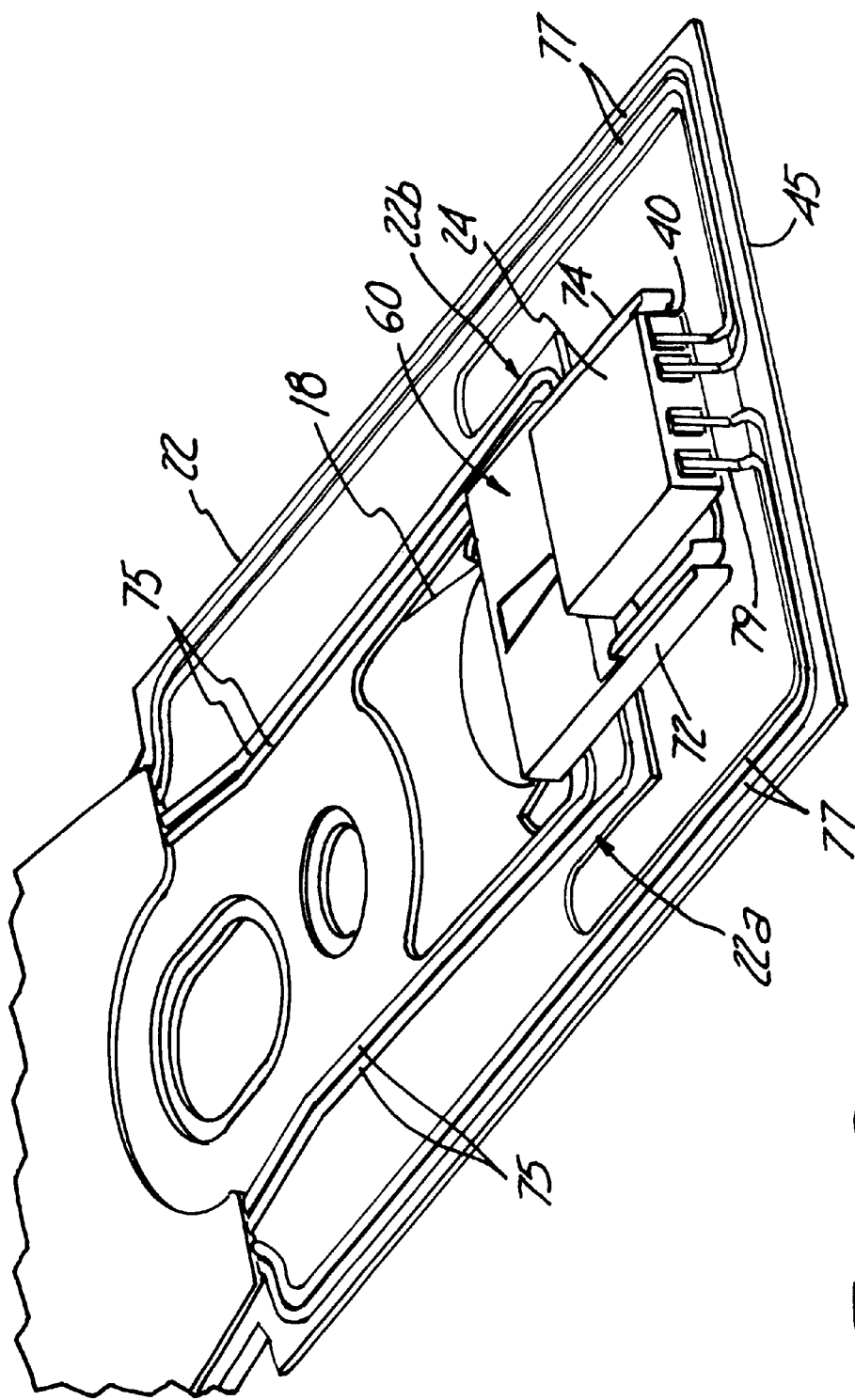
FIG. 3B is a bottom perspective view of the disc drive microactuation system shown in FIG. 3A.
Figure 3C:
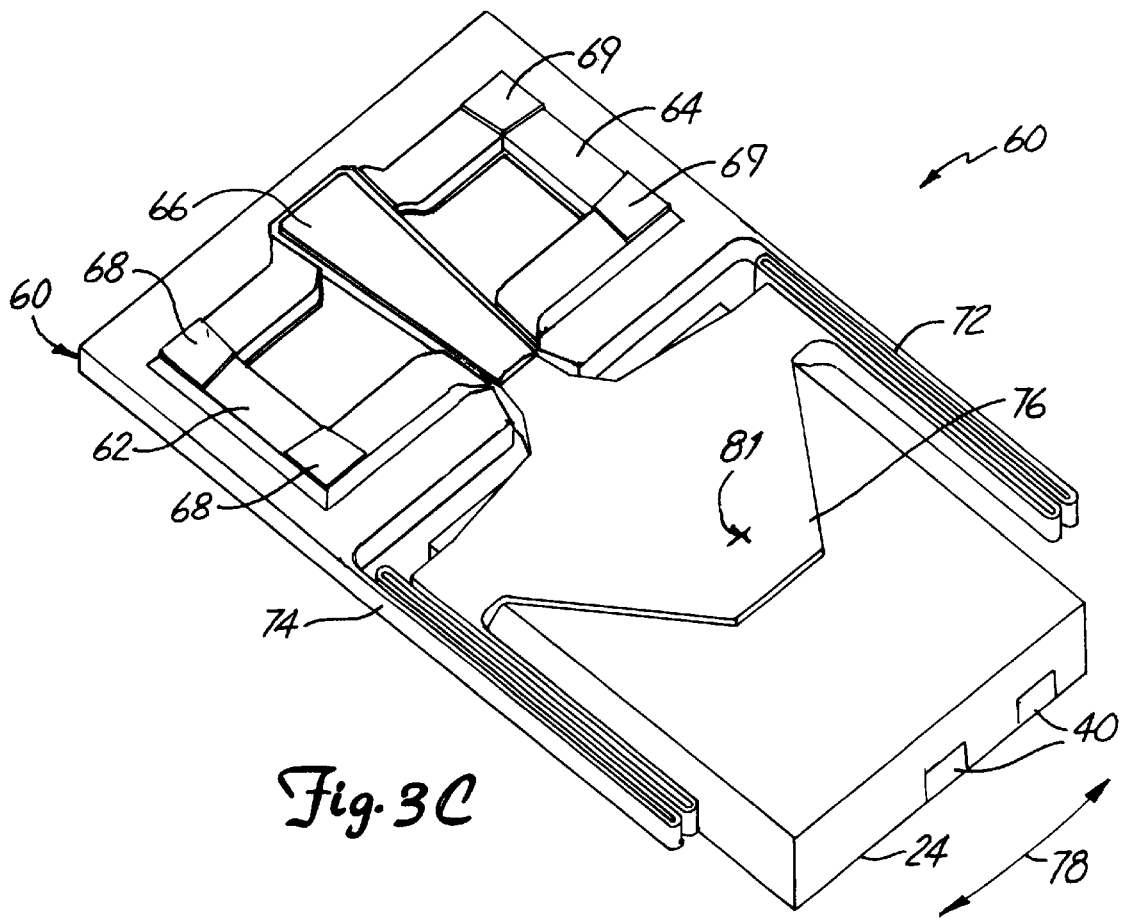
FIG. 3C is a perspective view of a microactuator configured between the flexure and the slider of the disc drive microactuation system shown in FIG. 3A.

FIG. 3A is a top perspective view, and FIG. 3B is a bottom perspective view of a disc drive microactuation system for positioning slider 24 over tracks of a disc according to the present invention. FIG. 3C is a perspective view of microactuator 60 configured between flexure 22 and slider 24 in the disc drive microactuation system. Flexure 22 is mounted to the underside of a distal end of head suspension 18 in a conventional manner. Flexure 22 includes arms 22a and 22b forming an aperture therebetween to provide resilience and gimbaling spring to flexure 22. Flexure 22 further includes tongue portion 70 in substantially the same plane as flexure arms 22a and 22b. The distal end of arms 22a and 22b are connected via tongue portion 70.

Microactuator 60 includes first stator 62 and second stator 64, with bond pads 68 and 69 providing access to contact first and second stators 62 and 64. Rotor 66 is formed between first and second stators 62 and 64, and is movable with respect to the stators. Flexible arms 72 and 74 extend from the body of the stator portion of microactuator 60 and connect on opposite sides to central tongue 76, which is attached to a distal end of rotor 66 and is attached to slider 24 by an adhesive, for example. Pre-load force is applied through central tongue 76 to slider 24 at pre-load point 81. Therefore, operation of microactuator 60 translationally moves rotor 66 with respect to first and second stators 62 and 64, which in turn forces bending of arms 72 and 74 and alters the position of central tongue 76, moving transducing head 40 with respect to flexure 22 in the direction of arrows 78, to radially position head 40 over a radial data track of a rotating disc below slider 24.

Electrical connections to bond pads 68 and 69 are made by conductive traces 75 on the underside of flexure 22, which terminate and make contact at bond pads 68 and 69 on stators 62 and 64. Conductive traces 77 are also patterned on the underside of flexure 22 to contact transducing head 40. Electrical connections between transducing head 40 and conductive traces 77 are made by flexible conducting wires 79, to permit movement of slider 24 with respect to cross beam 45 of flexure 22. Thus, the microactuator may be readily connected to an external microactuator control circuit and transducing head 40 may be readily connected to external signal processing circuitry, both connections being provided through conductive traces or other electrical connection techniques on flexure 22.

Figure 4:
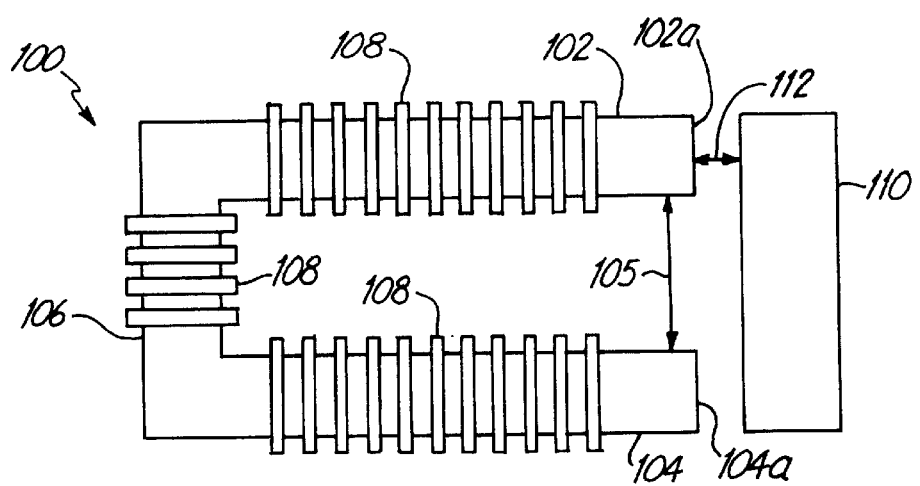
FIG. 4 is a plan view of a magnetic microactuator having solenoid-type coil windings.

FIG. 4 is a plan view of a prior art solenoid-type magnetic microactuator 100. Microactuator 100 has first pole piece 102, second pole piece 104 and via 106 connecting pole pieces 102 and 104 to form a "C" shaped magnetic stator. Coils 108 are wound around first pole piece 102, second pole piece 104 and via 106. The first and second pole pieces are separated by a pole gap 105. A magnetic rotor core piece 110 is separated from face 102a of first pole piece 102 and face 104a of second pole piece 104 by air gap 112. Operation of microactuator 100 by applying current through coils 108 results in movement of rotor core 110 with respect to faces 102a and 104a of pole pieces 102 and 104, respectively.

Figure 5:
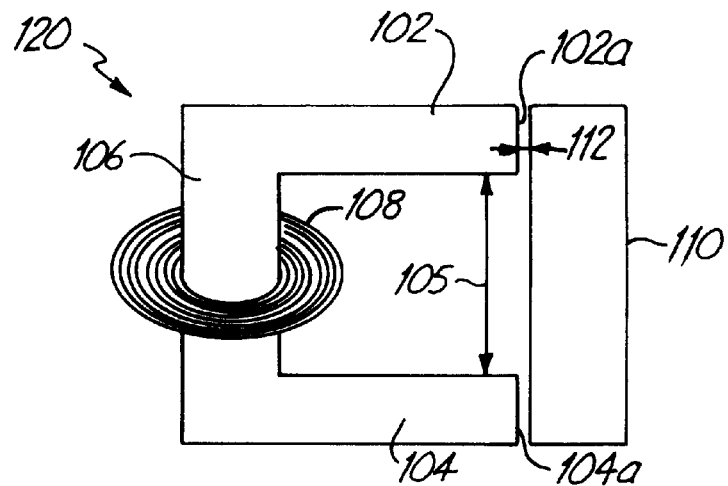
FIG. 5 is a plan view of a magnetic microactuator having planar-type coil windings.

FIG. 5 is a plan view of a prior art planar-type magnetic microactuator 120. Microactuator 120 includes first pole piece 102, second pole piece 104 and magnetic via 106 connecting pole pieces 102 and 104 to form a "C" shaped magnetic stator. Coils 108 are concentrically wound around magnetic via 106. Pole pieces 102 and 104 are separated by a pole gap distance 105. A magnetic rotor core piece 110 confronts face 102a of first pole piece 102 and face 104a of second pole piece 104, separated from the faces by air gap 112. Operation of microactuator 120 by applying current through coils 108 results in movement of rotor core 110 with respect to faces 102a and 104a of pole pieces 102 and 104, respectively.

Figure 6:
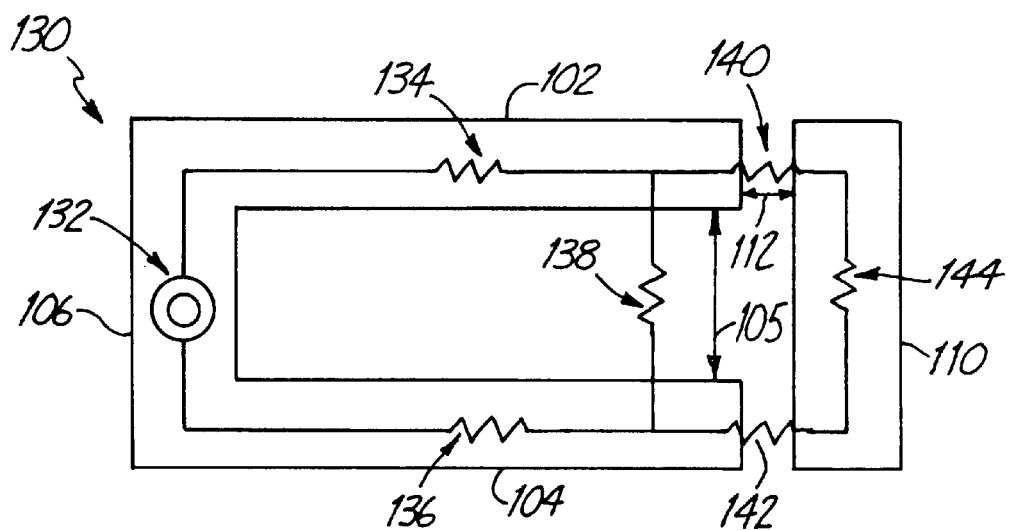
FIG. 6 is a schematic diagram of a magnetic microactuator as shown in FIGS. 4 and 5, illustrating the magnetic circuit elements of the microactuator.

FIG. 6 is a schematic model of the magnetic circuit 130 formed by the magnetic microactuators shown in FIGS. 4 and 5. Source 132 represents the magnetic flux provided through the magnetic stator cores from coils 108 wrapped around the cores. Reluctance 134 represents the magnetic reluctance of first pole piece 102, and reluctance 136 represents the magnetic reluctance of second pole piece 104. Reluctance 138 represents the magnetic reluctance of pole gap 105 between pole pieces 102 and 104. Reluctance 140 represents the magnetic reluctance of air gap 112 between the face of pole piece 102 and rotor 110, and reluctance 142 represents the magnetic reluctance of air gap 112 between the face of pole piece 104 and rotor 110. Reluctance 144 represents the magnetic reluctance of rotor 110.

Pole gap reluctance 138 is effectively in parallel with the flux path through reluctance 140 of air gap 112 between pole piece 102 and rotor 110, reluctance 144 of rotor 110 and reluctance 142 of air gap 112 between pole piece 104 and air gap 112. Accordingly, for a given series reluctance (of which the air gap reluctance is the most significant factor), increasing pole gap reluctance 138 would increase the magnetic flux through the air gap between the stator and the rotor. The larger the magnetic flux through the air gap, the higher magnetic force is generated between the stator and the rotor, improving the performance of the microactuator. The higher pole gap reluctance 138 effectively reduces leakage flux between poles 102 and 104 that reduces the flux flowing through air gap 112.

However, there is a competing constraint in that it is desirable to have a small pole gap to enhance the coupling of electromagnetic fields between poles 102 and 104, thereby increasing the overall inductance of the transducer and inducing greater magnetic flux for a given current applied through coils 108. Magnetic devices in the prior art have featured a constant pole gap chosen to provide the greatest magnetic flux through air gap 112 for a given current applied through a particular configuration of coils 108. The present invention improves the force provided by the magnetic microactuator by increasing the magnetic flux flow through the air gap by varying the gap distance between poles 102 and 104.

Figure 7:
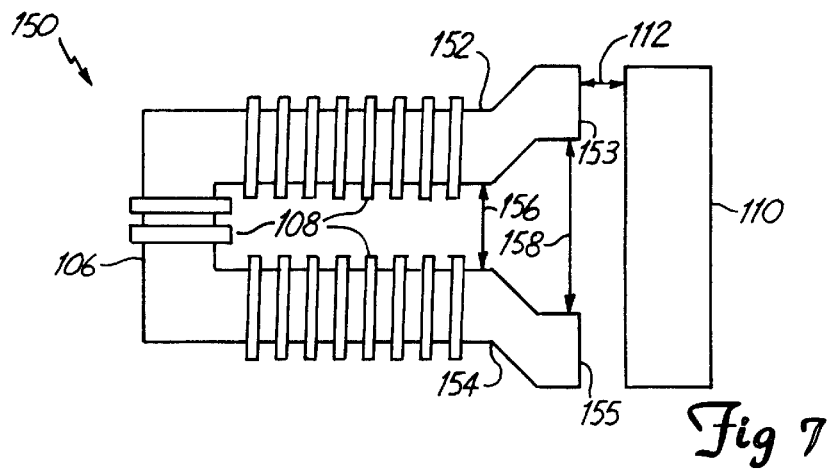
FIG. 7 is a plan view of a solenoid-type magnetic microactuator having shaped pole pieces according to the present invention.

FIG. 7 is a plan view of a solenoid-type magnetic microactuator 150 having shaped pole pieces according to the present invention. Microactuator 150 has first pole piece 152, second pole piece 154 and via 106 connecting pole pieces 152 and 154 to form a generally "C" shaped magnetic stator. Coils 108 are wound around first pole piece 152, second pole piece 154 and via 106. The first and second pole pieces are separated proximal to via 106 by a pole gap 156. Pole pieces 152 and 154 are shaped at an end distal to via 106, so that pole pieces 152 and 154 are separated distal from via 106 by a pole gap 158 that is larger than pole gap 156. A magnetic rotor core piece 110 is separated from face 153 of first pole piece 152 and face 155 of second pole piece 154 by air gap 112. Operation of microactuator 150 by applying current through coils 108 results in movement of rotor core 110 with respect to faces 153 and 155 of pole pieces 152 and 154, respectively.

Figure 8:
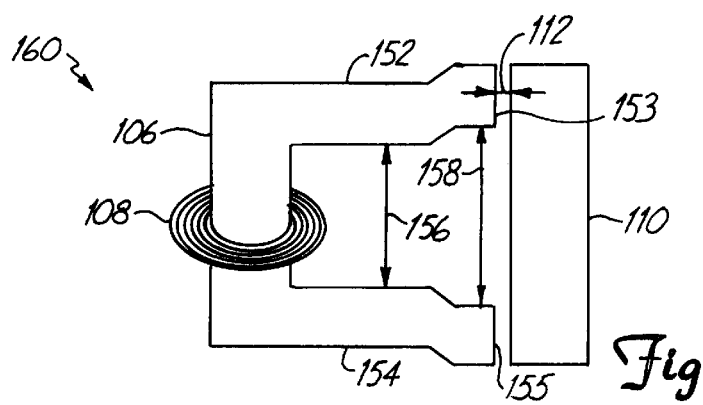
FIG. 8 is a plan view of a planar-type magnetic microactuator having shaped pole pieces according to the present invention.

FIG. 8 is a plan view of a planar-type magnetic microactuator 160 having shaped pole pieces according to the present invention. Microactuator 160 includes first pole piece 152, second pole piece 154 and magnetic via 106 connecting pole pieces 152 and 154 to form a generally "C" shaped magnetic stator. Coils 108 are concentrically wound around magnetic via 106. Pole pieces 152 and 154 are separated distal from via 106 by a pole gap 158 that is larger than pole gap 156. A magnetic rotor core piece 110 is separated from face 153 of first pole piece 152 and face 155 of second pole piece 154 by air gap 112. Operation of microactuator 160 by applying current through coils 108 results in movement of rotor core 110 with respect to faces 153 and 155 of pole pieces 152 and 154, respectively.

The magnetic flux distribution and magnetic force acting on rotor 110 is modeled using transmission line theory, which is based on Maxwell's equations. The force is modeled assuming a solenoid-type magnetic actuator having a pole width of 160 microns, a pole thickness of 15 microns, a coil width of 6 microns, a coil pitch of 10 microns, a pole length of 448 microns, an air gap of 7.5 microns, 11 coil turns on the magnetic via, 30 coil turns on each pole, and 50 mA of current through the coils. For these exemplary parameters, the results shown in Table 1 are obtained.

TABLE 1

| Pole gap at via | Pole gap at air gap | Coil turns on poles | Mag. flux at via | Mag. flux at air gap | Drop in flux from via to air gap | Force at air gap |
|---|---|---|---|---|---|---|
| 320 microns | 320 microns | 30 | 7.36e-10 Wb | 6.84e-10 Wb | 7% | 38.6 $\mu$N |
| 174 microns | 174 microns | 30 | 7.81e-10 Wb | 6.79e-10 Wb | 13% | 38.0 $\mu$N |
| 174 microns | 274 microns | 26 | 10.4e-10 Wb | 9.50e-10 Wb | 8.7% | 73.0 $\mu$N |

As shown in Table 1, the shaped-pole configuration illustrated in FIG. 7 having a narrow pole gap at the via and a larger pole gap at the air gap provides significantly greater magnetic flux at the air gap and actuation force for the same applied current, even though the number of coil turns on the poles is slightly reduced. The microactuator of the present invention is therefore better able to overcome friction forces and spring bias forces in the disc drive in which it is employed, driving the head at a higher speed to accommodate the bandwidth required by the disc drive.

Figure 9:
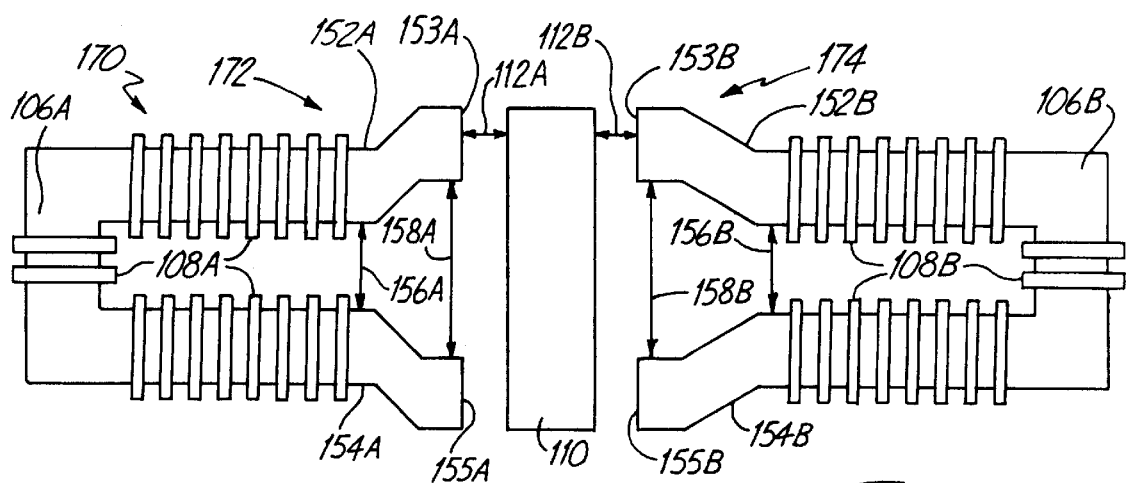
FIG. 9 is a plan view of a dual port device according to a second embodiment of the present invention, having a microactuator port and inductive position sensor port.

FIG. 9 is a plan view of dual port device 170 having a microactuator port 172 and an inductive position sensor port 174 according to a second embodiment of the present invention. Microactuator port 172 is similar to microactuator 150 shown in FIG. 7, and includes first pole piece 152A, second pole piece 154A and magnetic via 106A connecting pole pieces 152A and 154A to form a generally "C" shaped magnetic stator. Coils 108A are wound around first pole piece 152A, second pole piece 154A and via 106A. The first and second pole pieces are separated proximal to via 106A by a pole gap 156A. Pole pieces 152A and 154A are shaped at an end distal to via 106A, so that pole pieces 152A and 154A are separated distal from via 106A by a pole gap 158A that is larger than pole gap 156A. A magnetic rotor core piece 110 is separated from face 153A of first pole piece 152A and face 155A of second pole piece 154A by air gap 112A.

Inductive position sensor port 174 includes first pole piece 152B, second pole piece 154B and via 106B connecting pole pieces 152B and 154B to form a "C" shaped magnetic stator. Coils 108B are wound around first pole piece 152B, second pole piece 154B and via 106B. The first and second pole pieces are separated proximal to via 106B by a pole gap 156B. Pole pieces 152B and 154B are shaped at an end distal to via 106B, so that pole pieces 152B and 154B are separated distal from via 106B by a pole gap 158B that is larger than pole gap 156B. Magnetic rotor core piece 110 is separated from face 153B of first pole piece 152B and face 155B of second pole piece 154B by air gap 112B.

Microactuator port 172 functions in a manner similar to microactuator 150 shown in FIG. 7. Inductive position sensor 174 is operable to sense the relative displacement or velocity between rotor 110 and faces 153B and 155B of respective pole pieces 152B and 154B. With a bias current I applied to sensing coils 108B, the voltage V induced on the coils due to the change in inductance L(x) of the sensor can be formulated by $$V = I \frac{dL(x)}{dt}.$$

The inductance L(x) of the sensor is dependent on the air gap between faces 153B and 155B of the stator and rotor 110.

Therefore, changes in inductance are directly related to changes in the position of rotor 110 with respect to faces 153B and 155B of the stator. These changes in inductance may be measured by measuring the voltage induced on the coils, which is proportional to the change in inductance of the sensor, as indicated by the equation above. The shaped-pole configuration of inductive position sensor 174 increases the inductance of the device for a given current through the coils and a given movement of rotor 110, improving the sensitivity of the sensor to small motions of the rotor (and transducing head). The sensor is also provided in-situ, eliminating the need for an external device to detect movement of the microactuator.

Figure 10A:
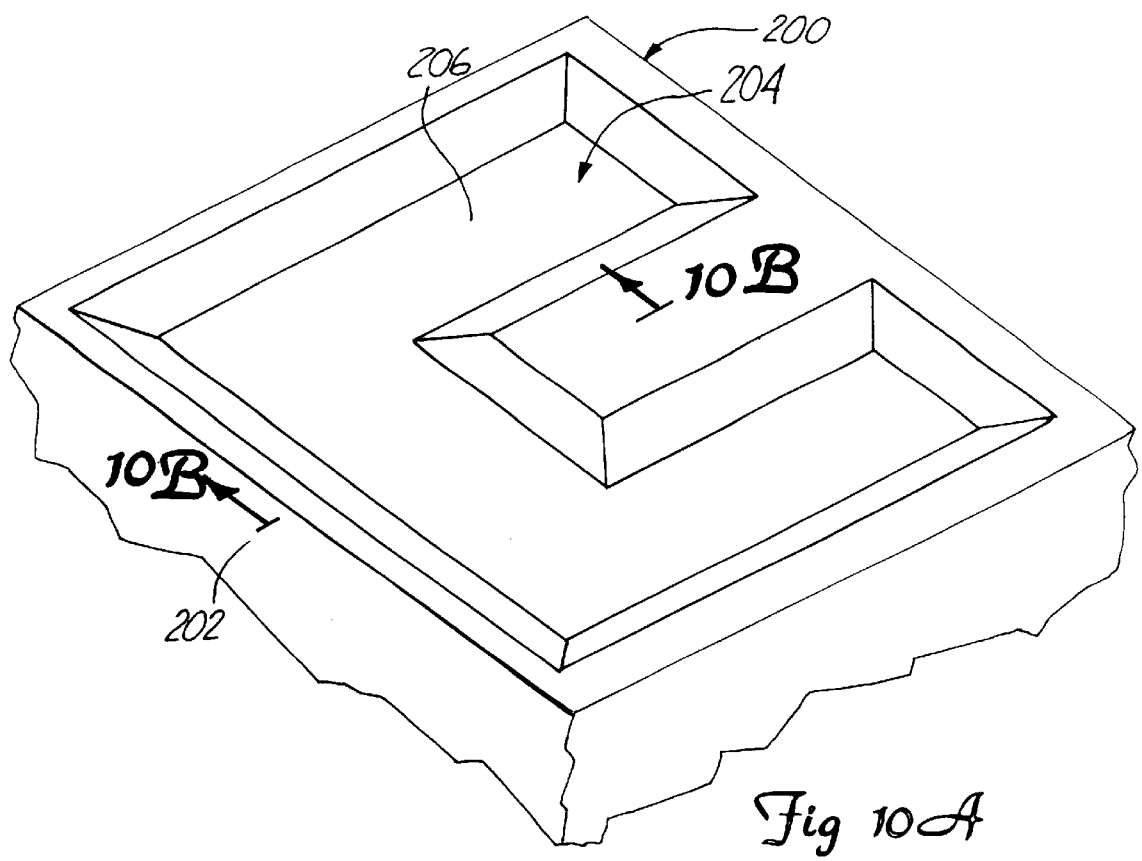
FIG. 10A is a perspective view.
Figure 10B:
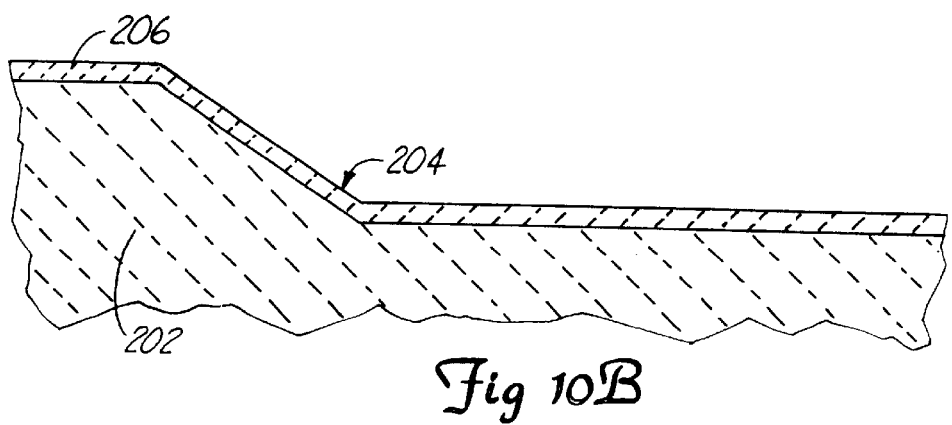
FIG. 10B is a section view of the microactuator wafer of the present invention, showing a tub etched in the wafer.

FIGS. 10A, 11A, 12A and 13A are perspective views, and FIGS. 10B, 11B, 12B, and 13B are section views of the stages of forming a microactuator wafer 200 according to a third embodiment of the present invention. As shown in FIGS. 10A and 10B, silicon wafer 202 is provided as a substrate. Substrate 202 is shown as a rectangular wafer, although any shape of wafer may also be used and later diced to the appropriate shape. Tub 204 is etched in a "C" shape in the top surface of wafer 202. Other shapes of tub 204 may be formed as long as they are sized to encompass the ferromagnetic cores and coils of the microactuator (shown in later figures). The surface of tub 204 is insulated by deposition of oxide dielectric 206, formed of silica or alumina, for example.

Figure 11A:
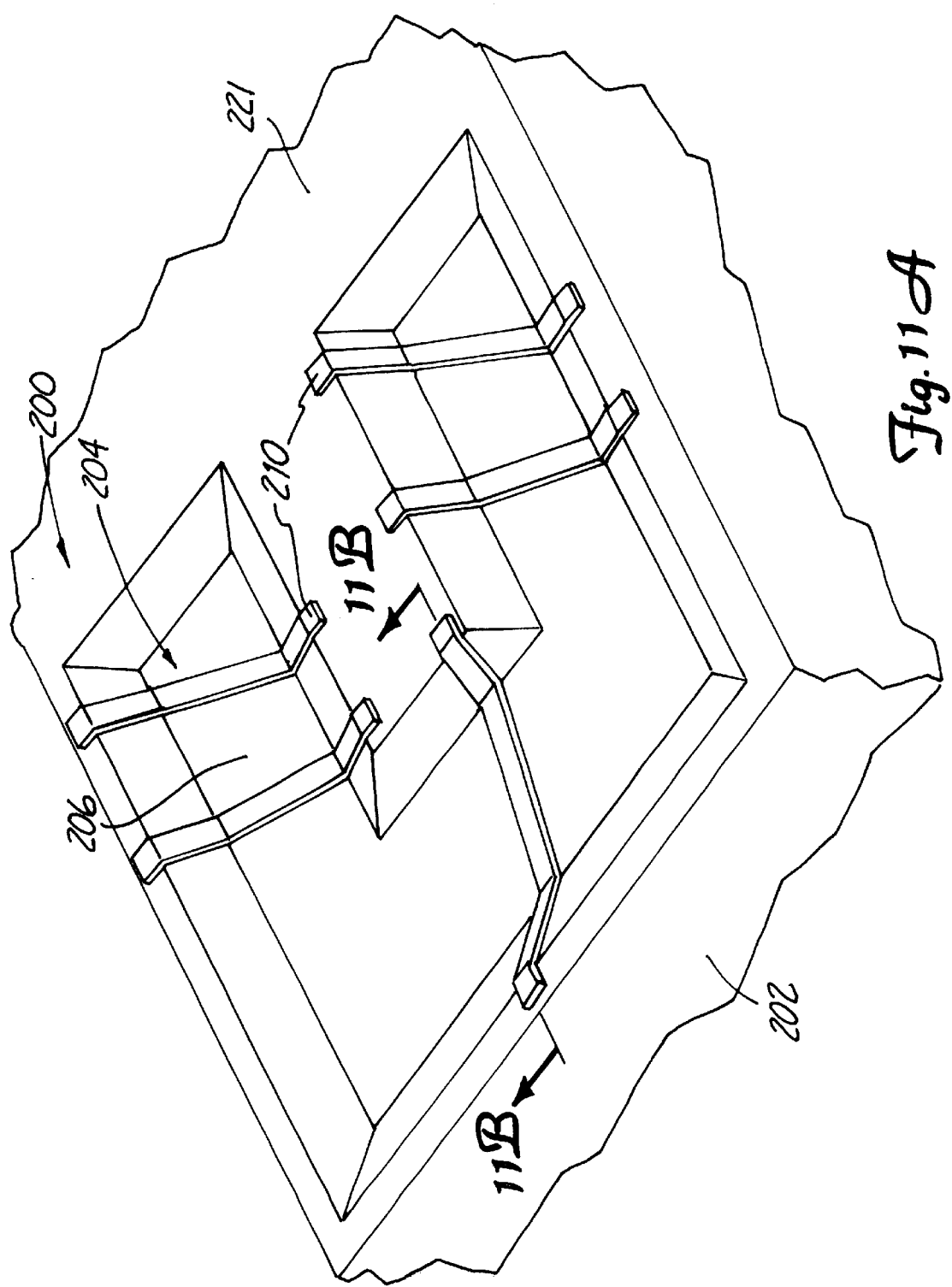
FIG. 11A is a perspective view.
Figure 11B:
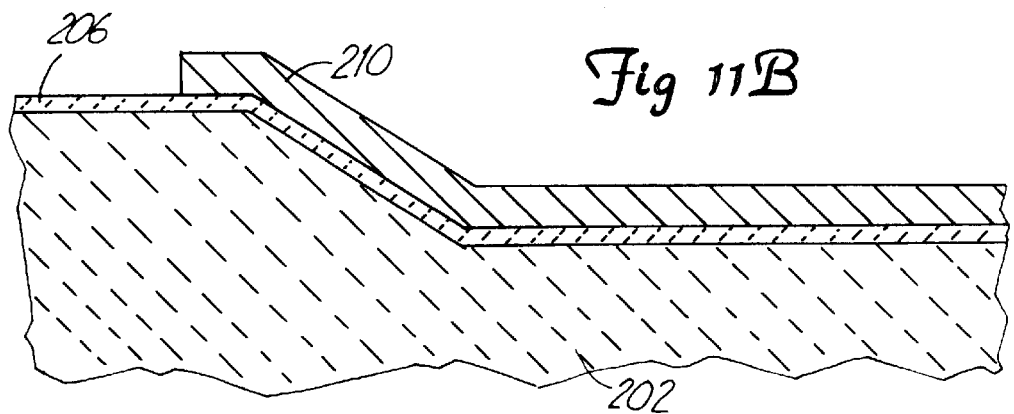
FIG. 11B is a section view of the magnetic microactuator of the present invention, showing the bottom coil layers formed in the tub.
Figure 12B:
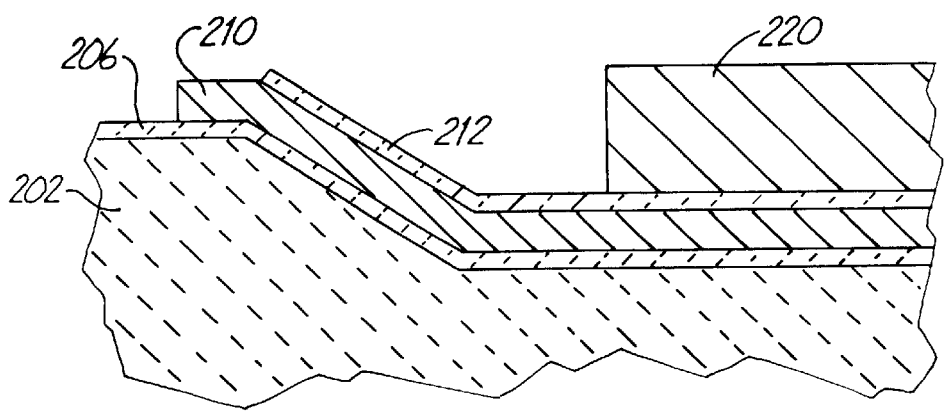
FIG. 12B is a section view of the magnetic microactuator of the present invention, showing the ferromagnetic core pieces forming the stator and rotor of the microactuator.
Figure 12A:
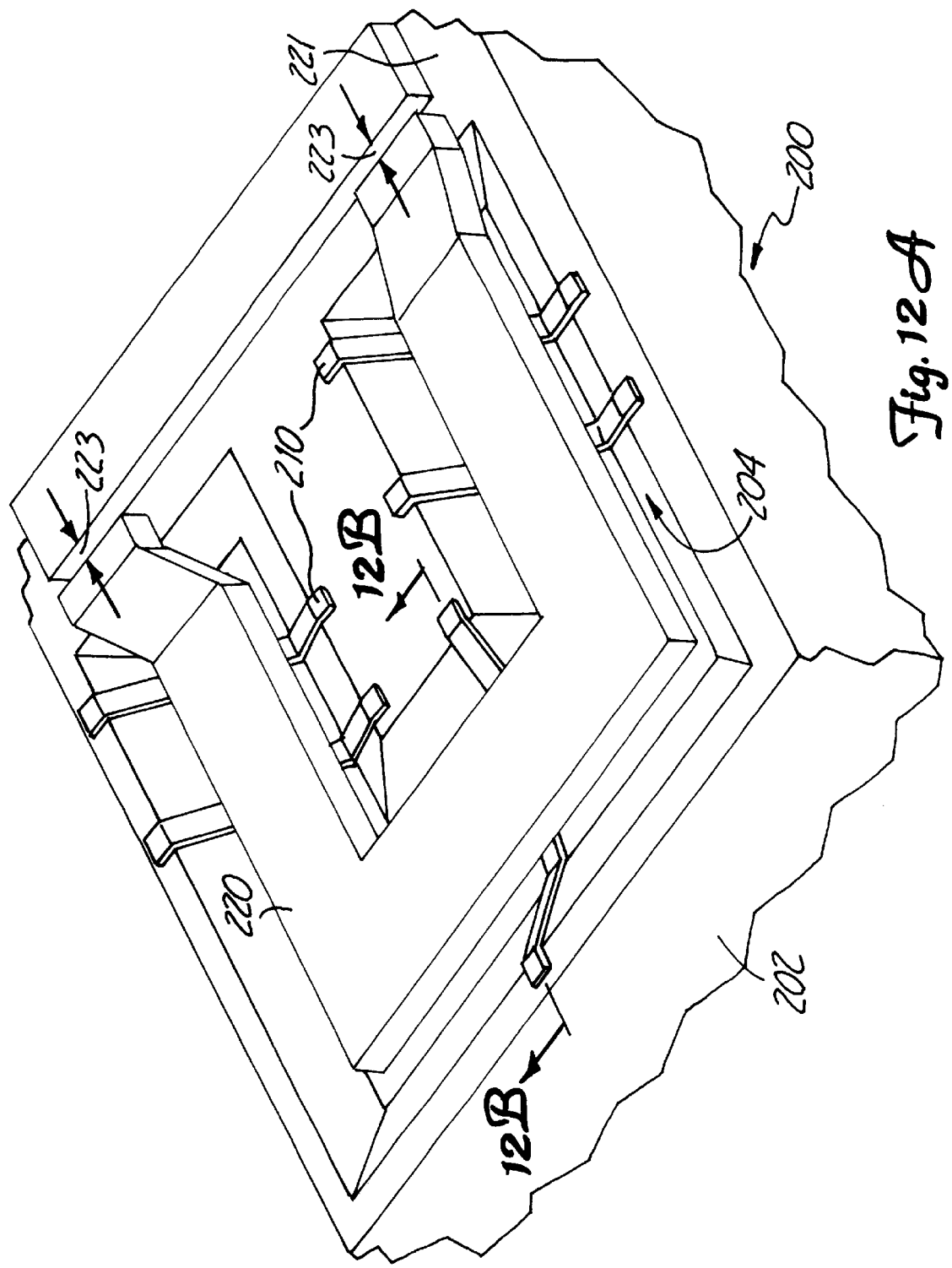
FIG. 12A is a perspective view.

A bottom layer of coil wires 210 are plated on oxide dielectric layer 206, as shown in FIGS. 11A and 11B. Coils 210 are plated in tub 204, with their ends extending up the wall of tub 204 and terminating at a point outside the tub perimeter. An insulating layer 212 is lithographically patterned over coils 210 so that the ends of coils 210 are exposed to allow connection to a top layer of coils, as shown in FIGS. 12A and 12B. Insulating layer 212 may be Novolac photoresist, for example, cured and hard baked to form a cross-linked phenolic resin which has high dielectric strength and is minimally affected by further processing steps. Alternatively, insulating layer 212 may be formed from photo-imageable polyimide resin, with higher temperature tolerance than phenolic material. Ferromagnetic core 220 is then plated to a thickness of about 15 microns on insulating layer 212. Rotor core piece 222 is formed on an adjoining portion 221 of substrate 202, leaving air gap 223 between rotor 222 and stator core 220. Stator core 220 slopes upward at the end of tub 204 near air gap 223, so that stator core 220 extends to the end of substrate 202 in the same plane as rotor core 222.

Figure 13B:
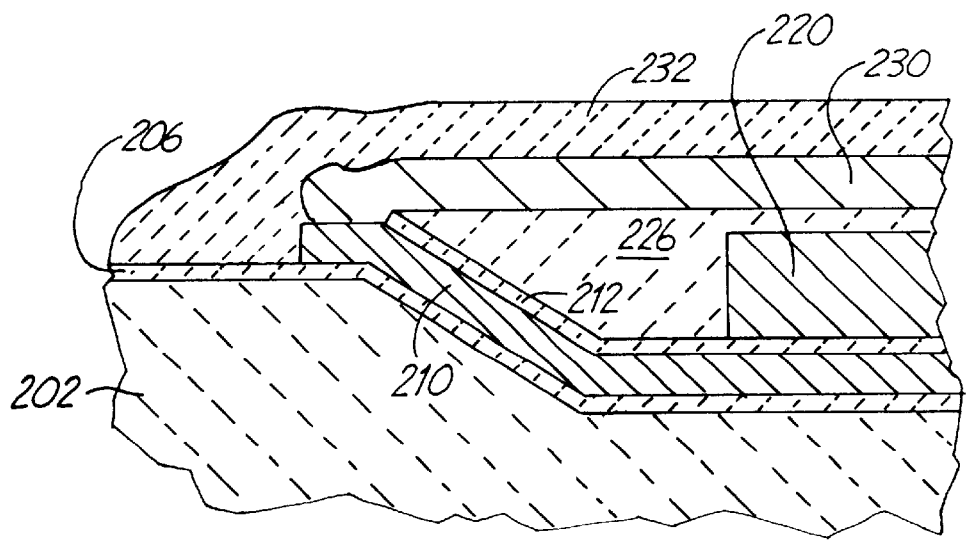
FIG. 13B is a section view of the magnetic microactuator of the present invention, showing the top coil layers formed over the ferromagnetic stator core piece and contacting the bottom coil layers.
Figure 13A:
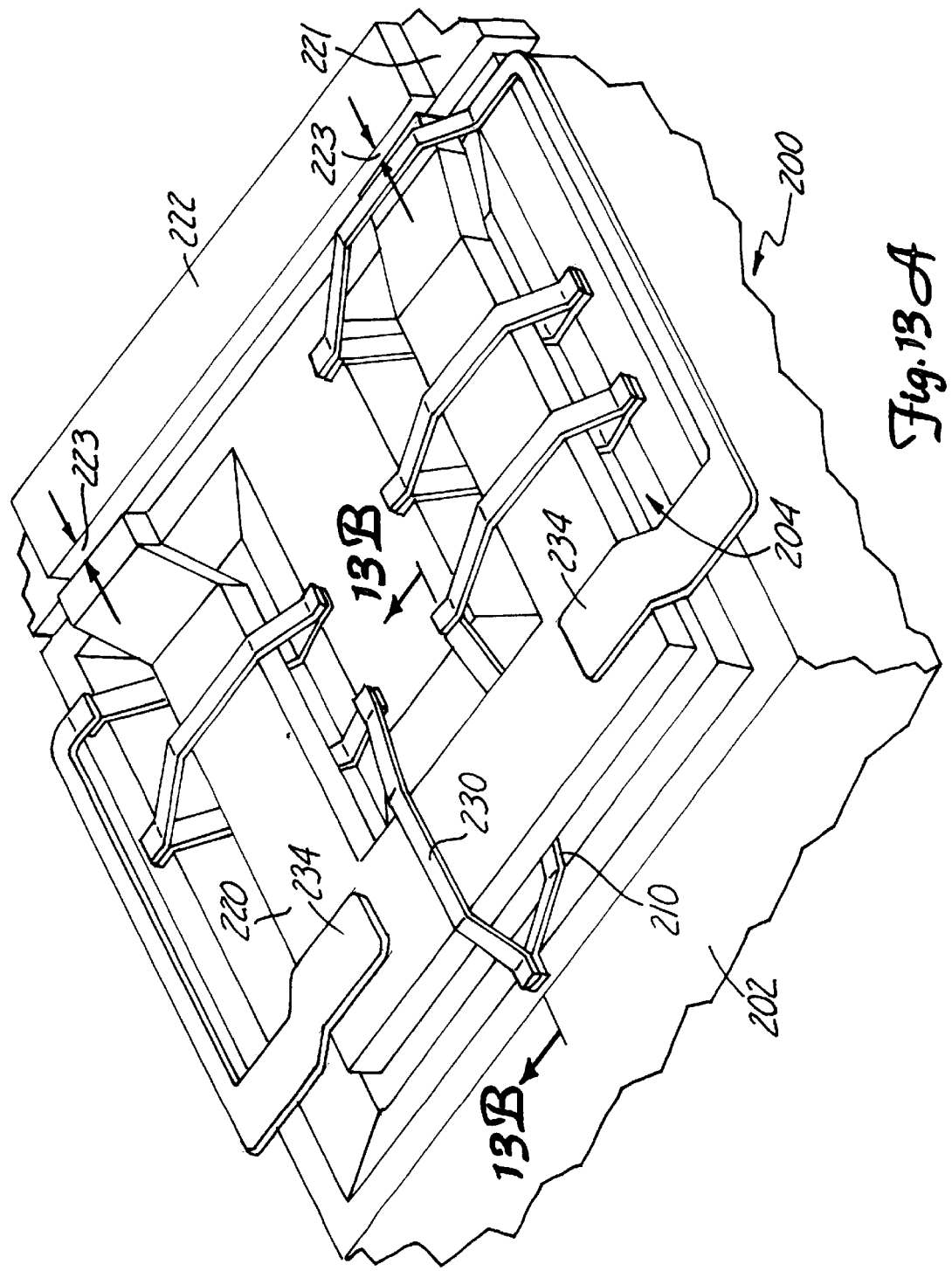
FIG. 13A is a perspective view.

A second insulating layer 226 is formed on and around ferromagnetic core 220, as shown in FIG. 13B (omitted from FIG. 13A for the sake of clarity). Insulating layer 226 is cured and hard baked in the same manner as insulating layer 212. Next, the top layer of coils 230 is plated on insulating layer 226, such that interconnections are made between bottom coil layer 210 and top coil layer 230 at the points outside of the perimeter of tub 204, and also forming bond pads 234. This configuration enables the coils to wrap around ferromagnetic core 220 and insulating layers 212 and 226 (FIG. 13B). Finally, an insulating overcoat layer 232 composed of alumina, for example, is formed over the entire structure, etched to expose bond pads 234 directly over the plan area of core 220, and substrates 202 and 221 are separated by etching, for example. By forming bond pads 234 directly over the plan area of core 220, significant space savings are achieved over prior art designs which required the bond pads to be formed at a remote location removed from the ferromagnetic core.

The process of forming microactuator wafer 200 shown in FIGS. 10A–13B addresses a significant problem experienced in the prior art. Previously, the layers of the microactuator were formed on a flat silicon substrate, rather than in tub 204 etched in silicon substrate 202 as shown in FIGS. 10A–13B. Therefore, where the thicknesses of the layers had exemplary parameters with the coil plating thickness being 6 microns, the photoresist insulator thickness being 3 microns, and the ferromagnetic layer being 15 microns thick, the net thickness from the oxide dielectric layer on the substrate to the top of the second photoresist insulator over the ferromagnetic layer was 27 microns. The step of plating the top coil layer over the second photoresist insulating layer requires patterning a uniform coating of photoresist over the entire structure. However, it was difficult to uniformly coat the structure with photoresist when the structure had a 27 micron topography. As a result, the resist tended to thin out atop the ferromagnetic core, and collected in the region of the interconnect between coil layers. The thin resist on the core tended to overexpose during developing, with a consequent undesirable increase in feature size in this region. If the feature growth due to photoresist overexposure was too large, the top layers of coils were patterned with unduly narrow gaps between them, which were subject to failure due to arcing between adjacent coil layers.

Another problem with the high topography of the prior art formation method was the change in topography elevation between the portion of the microactuator having the coils wrapped around the ferromagnetic core and the remainder of the microactuator. Because of the difference in elevation between these portions of the microactuator, it was impossible to precisely focus as the upper layers of the structure were photolithographically patterned, resulting in low resolution in patterning those features.

One prior art method to address the problem of patterning the top layer of coils was to insert a third, middle coil layer between the top and bottom coil layers. In the solenoid coil case, the middle layer consisted of studs connecting the ends of the top and bottom coil wires. The second photoresist insulating layer could be applied very thickly, such that it surrounded the studs and planarized the wafer surface for application of the photoresist for patterning the top coil layer. The use of a stud layer avoided the large changes in elevation in the wafer topography, but required a third plating process in addition to the plating processes for the top and bottom coil layers, which added complexity and expense to the microactuator formation process.

By employing the formation method illustrated in FIGS. 10A–13B, the changes in elevation of the wafer topography are reduced without adding any plating steps into the process. Tub 204 is initially etched with a depth of 13.5 microns, for example, with the layer thicknesses of the coils, insulating layers and ferromagnetic layer being the same as in the prior art (6 micron coils, 3 micron insulators and 15 micron ferromagnetic layer). Thus, bottom coil layer 210 is patterned with a 13.5 micron elevation difference, and top coil layer 230 is also patterned with a 13.5 micron elevation difference, in contrast to the 27 micron topography of the prior art. As a result, the resolution and control over feature size is significantly improved, without adding further processing steps.

One method to improve the performance of the magnetic microactuator is to decrease the reluctance through the magnetic circuit formed by the microactuator, since the actuation force is proportional to the square of the magnetic flux through the circuit and the magnetic flux ($\phi$) is defined by $$\phi = \frac{NI}{R}$$

where N is the number of coil turns, I is the coil current in amperes, and R is the magnetic reluctance of the microactuator circuit in amp-turns/Weber.

The reluctance of an element in the magnetic circuit is inversely proportional to the cross-sectional area of that element. Therefore, one way to reduce the reluctance of the circuit is to increase the cross-sectional area of the ferromagnetic core. However, due to limitations in the precision with which the air gap between the stator core and the rotor could be lithographically patterned, it was impractical in the prior art to increase the core thickness. Therefore, the core cross-section could only be increased in the prior art by patterning wider pole and rotor pieces. While this configuration did improve the actuation force, the plan area of the device had to be made larger, since the wider pole and rotor took up a greater area, which reduced the number of devices which could be patterned on a wafer and consequently increased the cost of each device.

Figure 14A:
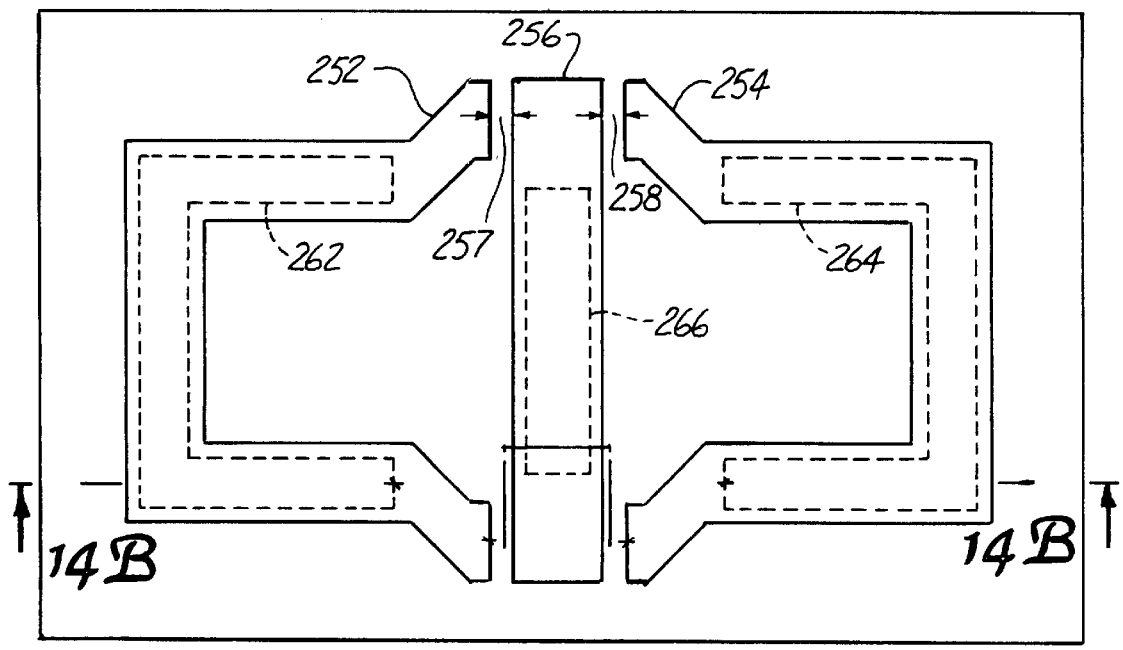
FIG. 14A is a top view.
Figure 14B:
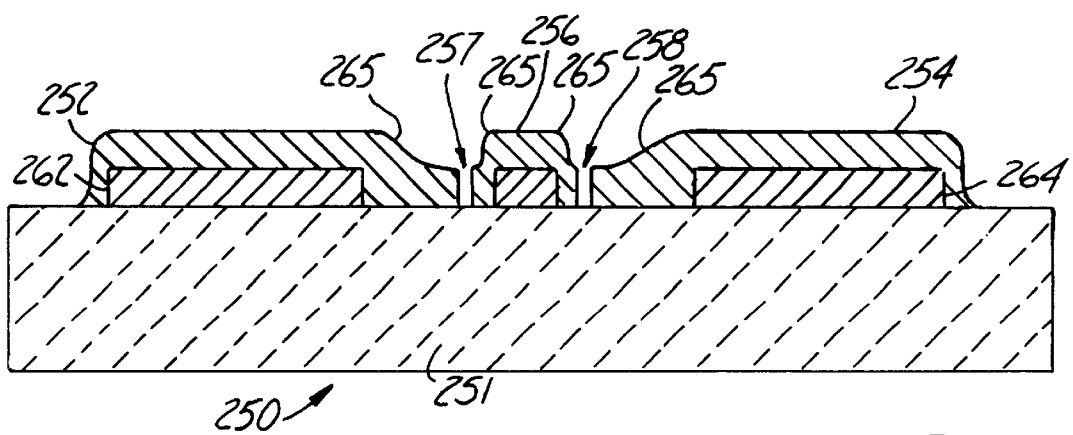
FIG. 14B is a section view of a dual port magnetic microactuator and inductive position sensor having yokes formed under the magnetic core pieces, according to a fourth embodiment of the present invention.

FIG. 14A is a plan view, and FIG. 14B is a section view of a dual-port microactuator 250 designed to decrease the reluctance of the magnetic microactuator circuit without increasing the plan area required by the device, according to a fourth embodiment of the present invention. A first port includes magnetic pole piece 252, having a shaped pole near air gap 257 as described above with respect to FIGS. 7–9. A second port includes magnetic pole piece 254 having a shaped pole near air gap 258 as described above with respect to FIGS. 7–9. Rotor 256 is positioned between poles 252 and 254, with air gap 257 between first pole piece 252 and rotor 256, and air gap 258 between second pole piece 254 and rotor 256. Ferromagnetic yokes 262 and 264 are plated beneath first pole piece 252 and second pole piece 254, respectively. Yoke 266 is plated beneath rotor 256. Yokes 262, 264 and 266 are preferably plated before pole pieces 252 and 254 and rotor 256. Yokes 262, 264 and 266 are not constrained to a thin layer depth, since they are not associated with precise air gaps 257 and 258. As shown in FIG. 14A, yokes 262, 264 and 266 are only formed under portions of pole pieces 252 and 254 and rotor 256 that are at least minimally distant from air gaps 257 and 258. Therefore, yokes 262, 264 and 266 may be formed with thicknesses at least equal to the thicknesses of pole pieces 252 and 254 and rotor 256, halving the magnetic reluctance of those pieces by doubling the cross-sectional area of the poles and the rotor. Coils wind around the entire yoke-core stacks, but are not shown in FIGS. 14A and 14B for the sake of clarity.

In addition, yoke 262 is formed with a width slightly narrower than pole piece 252, yoke 264 is formed with a width slightly narrower than pole piece 254, and yoke 266 is formed with a width slightly narrower than rotor 256. With such a configuration of yokes 262, 264 and 266 initially plated, plating of pole pieces 252 and 254 and rotor 256 over the yokes results in a slight overlap of pole pieces 252 and 254 and rotor 256 over the corners of yokes 262, 264 and 266, such that rounded shoulders 265 are formed at the edges between the side and top surfaces of pole pieces 252 and 254 and rotor 256. The second photoresist insulating layer (layer 226 in FIG. 13B) deposits over pole pieces 252 and 254 more uniformly when rounded shoulders 265 are present, enhancing the formation process.

Air gaps 257 and 258 are preferably formed by patterning a photoresist dam between yokes 262, 264 and 266. The height and width of the photoresist dam are carefully controlled so that plating of pole pieces 252 and 254 and rotor 256 yields air gaps 257 and 258 having uniform and precise dimensions and shapes.

Figure 15:
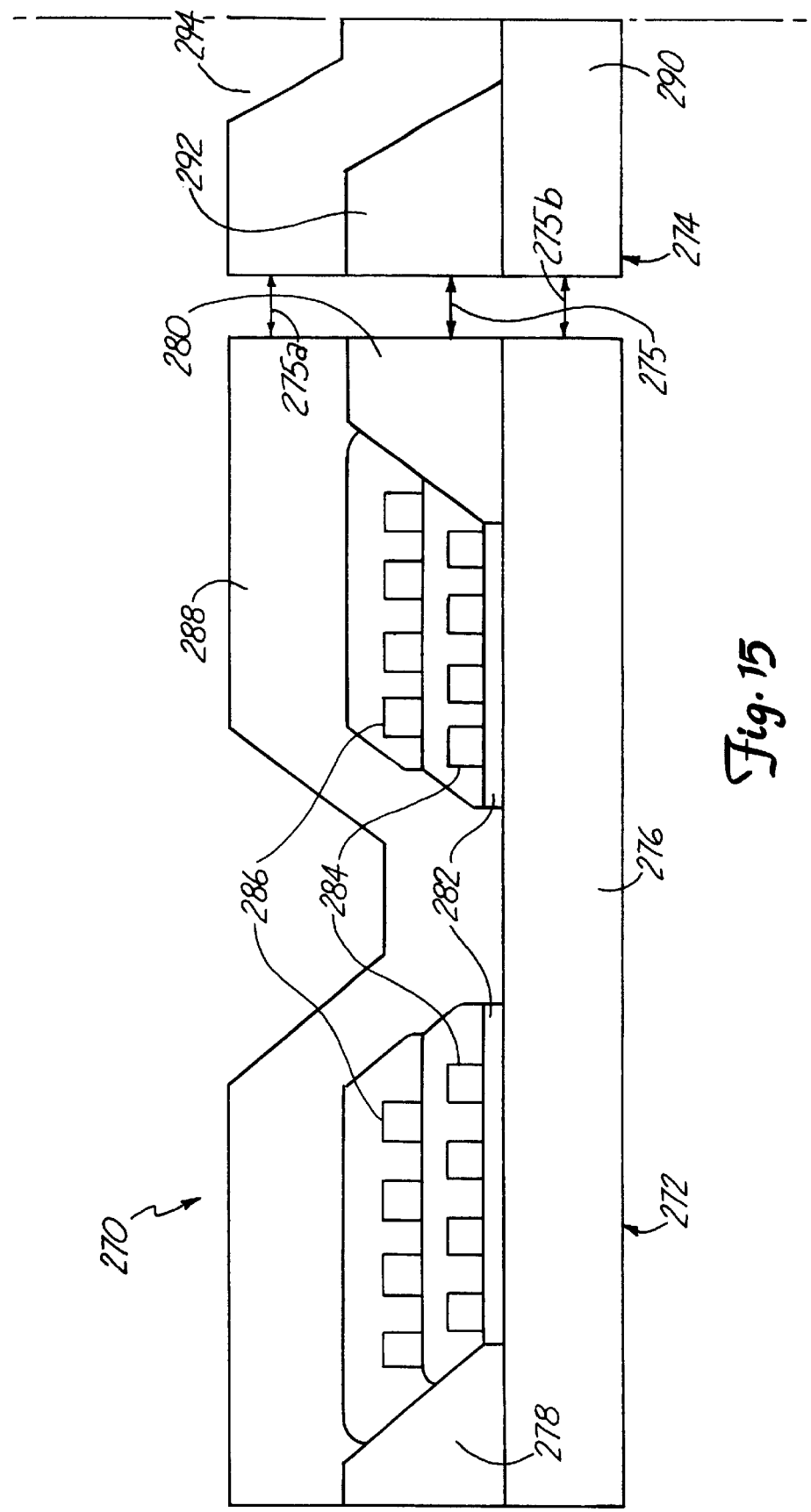
FIG. 15 is a layer diagram of a magnetic microactuator having dual planes of magnetic flux flow according to a fifth embodiment of the present invention.

FIG. 15 is a layer diagram of a magnetic microactuator 270 having dual planes of magnetic flux flow according to a fifth embodiment of the present invention. Bottom pole piece 276 of stator 272 and bottom pole piece 290 of rotor 274 are initially formed. Ceramic spacers 278 and 280 are formed at opposite ends of bottom pole piece 276, and ceramic spacer 292 is formed adjacent air gap 275 between stator 272 and rotor 274 on bottom pole piece 290. Ceramic spacers 278, 280 and 292 maybe formed of silica, alumina, or some other suitable non-magnetic material. Thin insulating layers 282 are deposited on bottom pole piece 276 adjacent spacer layers 278 and 280. First coil layer 284 is formed on insulating layers 282, with the coils being concentrically wrapped around one another. First coil layer 284 is surrounded by insulating photoresist, for example, and second coil layer 286 is formed over first coil layer 284 in a manner similar to the formation of first coil layer 284. Second coil layer 286 is similarly surrounded by an insulating photoresist layer. Top pole piece 288 is then plated over the resulting surface, contacting bottom pole piece 276 in the center of coil layers 284 and 286. Top pole piece 294 of rotor 274 is formed over bottom pole piece 290 and ceramic spacer 292, contacting bottom pole piece 290 in a region spaced from air gap 275 between stator 272 and rotor 274.

Figure 16:
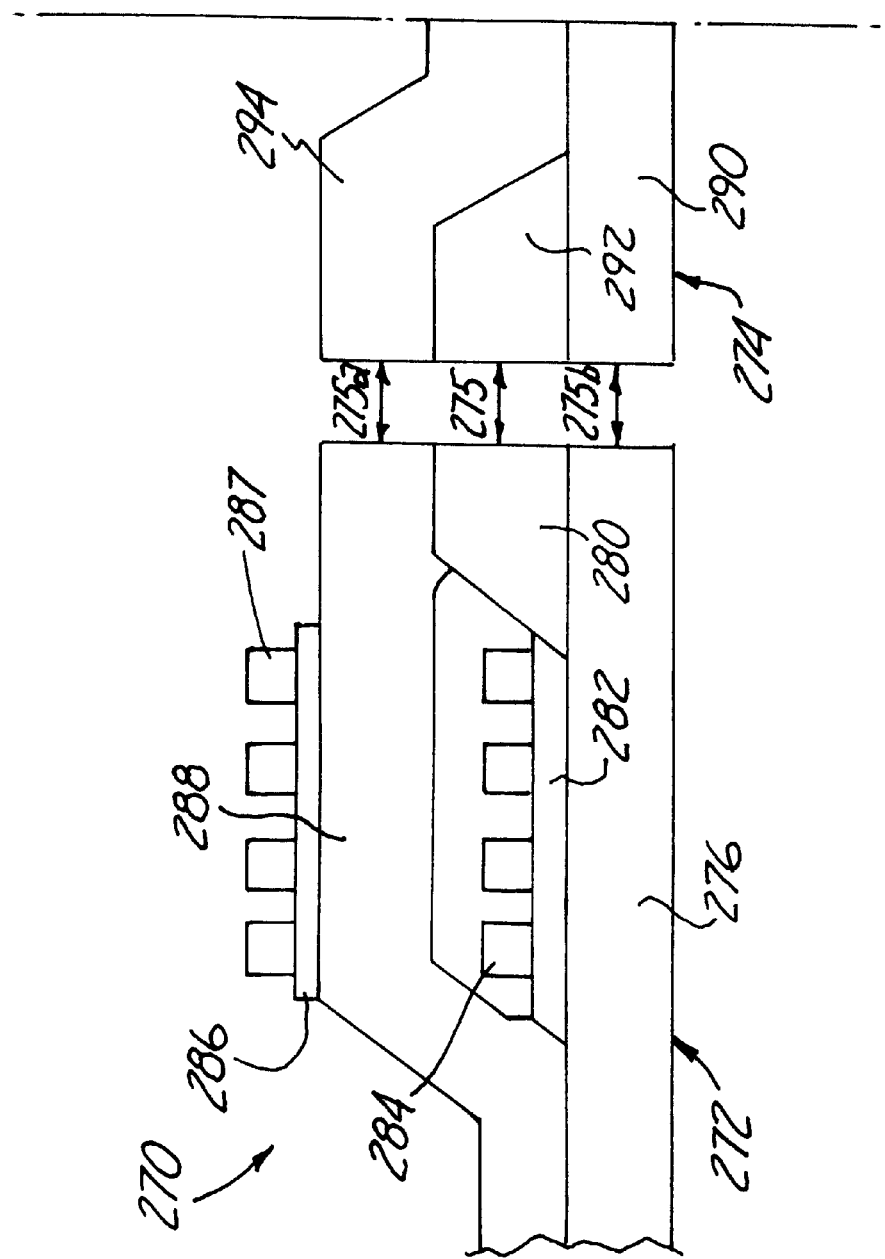
FIG. 16 is a layer diagram of a magnetic microactuator having dual planes of magnetic flux flow according to a sixth embodiment of the present invention.

FIG. 16 is a layer diagram of magnetic microactuator 270 having dual planes of magnetic flux flow according to a sixth embodiment of the present invention. Bottom pole piece 276 of stator 272 and bottom pole piece 290 of rotor 274 are initially formed. Ceramic spacer 280 is formed at an end of bottom pole piece 276, and ceramic spacer 292 is formed adjacent air gap 275 between stator 272 and rotor 274 on bottom pole piece 290. Ceramic spacers 280 and 292 may be formed of silica, alumina, or some other suitable non-magnetic material. Thin insulating layer 282 is deposited on bottom pole piece 276 adjacent spacer layer 280. Bottom coil layers 284 are formed on insulating layer 282, and are surrounded by an insulating photoresist layer. Top pole piece 288 is then plated over the resulting surface, contacting bottom pole piece 276 at an end opposite air gap 275 and being supported by ceramic spacer layer 280. A second thin insulating layer 286 is deposited on top of pole piece 288, and top coil layers 287 are formed on insulating layer 286. Top pole piece 294 of rotor 274 is formed over bottom pole piece 290 and ceramic spacer 292, contacting pole piece 290 in a region spaced from air gap 275 between stator 272 and rotor 274.

The configurations shown in FIGS. 15 and 16 provide a path for magnetic flux from top pole piece 288 of stator 272 through top air gap 275a, top pole piece 294 of rotor 274, bottom pole piece 290 of rotor 274, bottom air gap 275b and bottom pole piece 276 of stator 272 in a single vertical plane. As a result, the wafer area taken up by microactuator 270 is less than could be attained in the prior art, where the first and second pole pieces of the stator were spaced from each other in a plane parallel to the wafer surface. Air gaps 275a and 275b are preferably lithographically patterned in separate steps to accommodate a thickness of spacers 280 and 292 of larger than 20 microns, for example, preventing excessive flux leakage between the top and bottom core layers. Because microactuator 270 requires less wafer area, the cost of each microactuator device may potentially be reduced. Each of the dual layers may additionally have yokes as described above with respect to FIGS. 14A and 14B.

The various above-described embodiments of the present invention provide an improved magnetic microactuator for finely positioning a transducing head over a selected track of a rotatable disc. The microactuator produces increased actuation force, may be formed with higher resolution and a lower failure rate, and is readily mass producible at low cost.

Although the present invention has been described with reference to preferred embodiments, workers skilled in the art will recognize that changes may be made in form and detail without departing from the spirit and scope of the invention.

What is claimed is:

1. A process of forming a microactuator for positioning a transducing head over a selected radial track of a rotatable disc in a disc drive system having a flexure to support a slider carrying the transducing head, the process comprising:

etching a tub in a substrate thereby forming an empty cavity in the substrate;

plating a bottom coil layer at least partially in the cavity;

depositing a first insulating layer on the bottom coil layer;

forming a ferromagnetic core layer on the first insulating layer;

depositing a second insulating layer on and around the ferromagnetic coil layer;

plating a top coil layer on the second insulating layer, the top coil layer contacting the bottom coil layer at a point spaced from the ferromagnetic core; and forming a rotor on a rotor substrate to confront the ferromagnetic core, the rotor being operatively attached to the slider and movable with respect to the ferromagnetic core.

2. The process of claim 1, wherein the ferromagnetic core layer is formed with a first pole piece having first and second ends, a second pole piece substantially parallel to and spaced from the first pole piece, the second pole piece having first and second ends, and a magnetic via connecting the first pole piece and the second pole piece, wherein the first and second pole pieces are shaped so that a first gap between the first end of the first pole piece and the first end of the second pole piece is smaller than a second gap between the second end of the first pole piece and the second end of the second pole piece.

3. The process of claim 1, further comprising depositing an insulating overcoat over the microactuator.

4. The process of claim 1, further comprising:

forming a plurality of bond pads directly over a plan area of the ferromagnetic core layer.

5. The process of claim 1, wherein the cavity is etched with a depth of about 13.5 microns.

6. The process of claim 1, wherein the ferromagnetic core layer is formed with a thickness of about 15 microns.

7. The process of claim 1, wherein the top coil layer and the bottom coil layer are formed with a thickness of about 6 microns.

* * * * *

UNITED STATES PATENT AND TRADEMARK OFFICE
CERTIFICATE OF CORRECTION

PATENT NO. : 6,694,603 B1
DATED : February 24, 2004
INVENTOR(S) : Lei Zhang et al.

It is certified that error appears in the above-identified patent and that said Letters Patent is hereby corrected as shown below:

Column 12,
Line 29, delete "coil", insert -- core --

Signed and Sealed this

Twenty-second Day of March, 2005

JON W. DUDAS
*Director of the United States Patent and Trademark Office*